INVENTOR
NIRO AKAHANE
BY Stanley Wolder
ATTORNEY

July 24, 1962  NIRO AKAHANE  3,045,575
AUTOMATIC CAMERA DIAPHRAGM

Filed Oct. 8, 1959  2 Sheets-Sheet 2

INVENTOR
NIRO AKAHANE
BY Stanley Walder
ATTORNEY

United States Patent Office 3,045,575
Patented July 24, 1962

3,045,575
AUTOMATIC CAMERA DIAPHRAGM
Niro Akahane, Shimosuwa-machi, Nagano-ken, Japan, assignor to Yashica Co., Ltd., Tokyo, Japan, a corporation of Japan
Filed Oct. 8, 1959, Ser. No. 845,163
Claims priority, application Japan Oct. 23, 1958
9 Claims. (Cl. 95—64)

The present invention relates generally to improvements in photographic cameras and it relates particularly to an improved automatic light actuated camera diaphragm.

In photographing an object it is necessary for optimum results that the light reaching the sensitive photographic film fall within a predetermined range of overall intensity. Thus the conventional camera whether a motion picture or still camera is provided with a variable aperture diaphragm for controlling the amount of light reaching the film. The diaphragm is generally manually adjusted in accordance with the lighting conditions, shutter speed and film speed for optimum results. This is a time consuming process subject to error. There have been many mechanisms and systems proposed and employed for automatically adjusting the diaphragm aperture in accordance with the light conditions. However, these mechanisms which include a photovoltaic cell connected to a sensitive current meter actuating the diaphragm, possessed numerous drawbacks and disadvantages. They are highly complicated devices subject to frequent malfunctioning, are often inaccurate and do not suitably cooperate with the camera optical system.

It is therefore a principal object of the present invention to provide an improved light responsive automatic camera diaphragm mechanism.

Another object of the present invention is to provide an improved light responsive automatic camera diaphragm having a variable aperture concentric with the optical axis of the camera lens system substantially independent of the aperture size.

Still another object of the present invention is to provide an improved light responsive automatic camera diaphragm wherein the aperture area and light intensity are optimumly related.

The above and other objects of the present invention will become apparent from a reading of the following description taken in conjunction with the accompanying drawings wherein.

Figure 1:
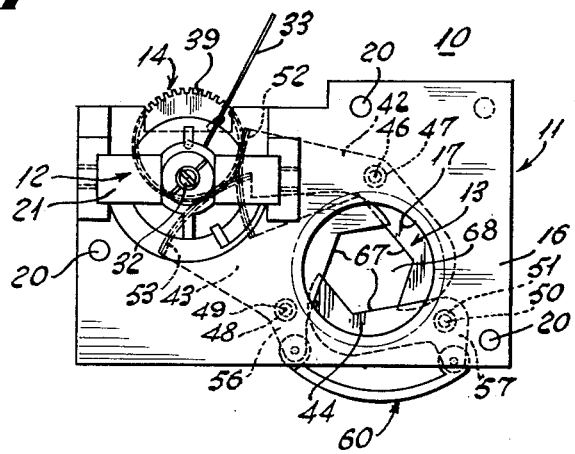
FIGURE 1 is a front elevational view of an automatic camera diaphragm mechanism embodying the present invention.
Figure 2:
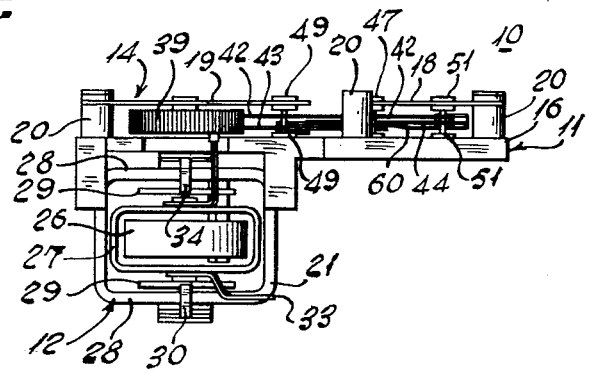
FIGURE 2 is a top plan view thereof.
Figure 3:
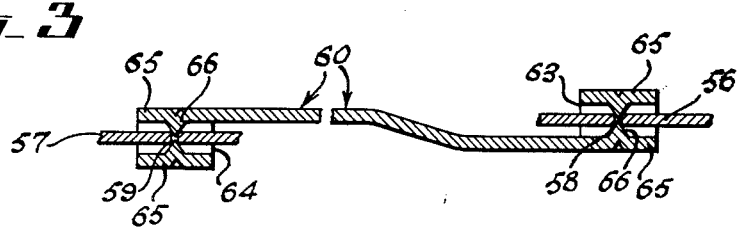
FIGURE 3 is a fragmentary sectional view of a connecting link forming part of the diaphragm mechanisms.
Figure 4:
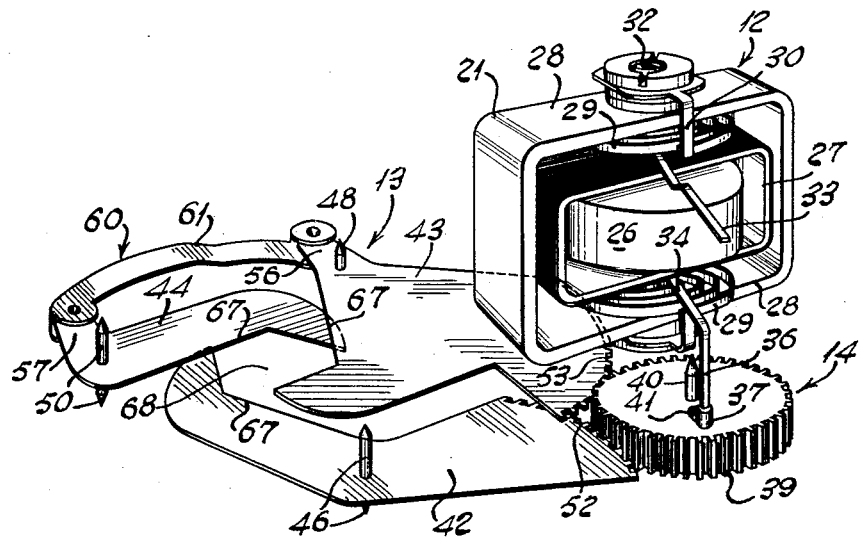
FIGURE 4 is a perspective view of the diaphragm and actuating meter arrangement.
Figure 5:
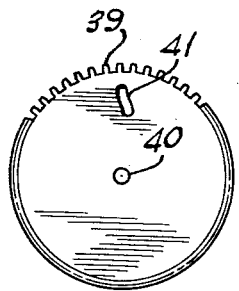
FIGURE 5 is a top plan view of the diaphragm control gear.

In a sense the present invention contemplates the provision of a light responsive automatic camera diaphragm mechanism which comprises a plurality of pivoted iris plates whose inner edges delineate a variable diaphragm opening, an electric current meter having a movable armature, means coupling at least one of said iris plates to the meter armature and means coupling another of said iris plates to said armature coupled iris plate whereby said iris plates move in unison and said diaphragm opening is varied. In accordance with the present improved construction there is provided a rotatable pinion gear having a cam defining groove formed in its end face and the meter armature has an arm terminating in a cam follower registering with said groove. The diaphragm consists of three iris plates, a first two of which have rack defining toothed outer edges engaging the pinion gear, the third iris plate being link connected to one of the first two iris plates. The iris plates are so shaped and supported that the variable diaphragm opening delineated by their inner edges is always symmetrical to the camera optical axis. Furthermore, the gear cam defining groove is so shaped that there is an optimum desired relationship between the light intensity actuating the meter through a related photovoltaic cell in the usual fashion and the diaphragm aperture, the relationship preferably being such that the light admitted to the camera is substantially independent of the aggregate light intensity.

Referring now to the drawings which illustrate a preferred embodiment of the present invention, the reference numeral 10 generally designates the improved light responsive automatic diaphragm mechanism which comprises a support framework 11, a sensitive current meter 12 which is connected in the conventional fashion to a desirably mounted photovoltaic or photoelectric cell, not shown, a variable aperture diaphragm 13 and a meter diaphragm coupling system 14. The support framework 11 includes a main mounting plate 16 which is suitably affixed to the camera body and has a circular opening 17 formed therein concentric with the optical axis of the camera lens system. A pair of laterally and vertically spaced support plates 18 and 19 are located rearwardly of and parallel to the plate 16 and are mounted thereon by means of standoff posts 20.

The meter 12 is suitably mounted on the side of the front face of the plate 16 and is of somewhat conventional construction including a support frame 21 and a centrally located magnet 26 carried by the frame 21. A swingable armature 27 in the form of a wire coil encircles the magnet 26 and is rotatably supported by and between the frame end walls 28 and electrically connected to a photovoltaic cell in the usual manner. A pair of biasing spiral hair springs 29 are disposed on opposite sides of the armature 27 and couple the armature 27 to the frame 21 to provide a counter torque to the armature upon rotation thereof as a consequence to the passage of current therethrough, to urge it to its zero position. One of the springs 29 has its outer end connected to the frame by way of a movable arm 30 positioned by a screw 32 to permit the adjustment and zeroing of the armature 27.

Projecting radially upwardly from the front face of the armature 27 is an indicator, or pointer 33 and projecting radially upwardly from the rear face of the armature 27 is an actuating arm 34 terminating in a rearwardly directed leg 36 carrying a cam following cylinder 37 at its free end. A pinion gear 39 is disposed rearwardly of the meter 12 and is upwardly offset relative to the axis of the armature 27. The pinion gear 39 is provided with a pair of axially located oppositely directed pivot pins or pointed spindles 40 which are rotatably engaged by mating pivot bearings, preferably of the jewel type, carried by the plates 16 and 19. Formed in the front face of the gear 39 is a cam defining groove 41 which is slidably engaged by the follower 37. Thus upon rotation of the armature 27 the gear is rotated by the actuating arm 34 by way of the leg 36, follower 37 and groove 41 in a manner non-linearly related to the rotation of the armature 27. The configuration of the groove 41 and the arrangement of the arm 34 are such, as can be readily accurately determined by one skilled in the art, that the area of the diaphragm aperture varies in direct inverse proportion to the intensity of the light actuating the meter 12 by way of the photovoltaic cell. The shape of the groove 41 also depends upon the characteristics of the photovoltaic cell, the meter and the diaphragm geometry.

The diaphragm 13 comprises a pair of main first and second iris plates 42 and 43 respectively and a supplementary iris plate 44. The iris plate 42 is rotatable in the plane thereof about a pair of supporting oppositely directed pointed spindles 46 engaging mating pivot bearings 47 carried by the plates 16 and 18, the iris plate 43 is rotatable in its plane above the iris plate 42 about a pair of supporting oppositely directed pointed spindles 48 engaging mating pivot bearings 49 carried by the plates 16 and 19 and the iris plate 44 is rotatable in its plane between the iris plates 42 and 43 about a pair of oppositely directed pointed spindles 50 engaging mating pivot bearings 51 carried by the plates 16 and 19. The pivot bearings are located at corners of an equilateral triangle whose center coincides with the center of the circular opening 17 and the optical axis of the camera. The iris plates 42 and 43 are provided with rack defining toothed outer edges 52 and 53 respectively which engage the pinion gear 39 and are arcuately sector shaped relative to the corresponding spindles 46 and 58 and have equal radii of curvature. Thus rotation of the gear 39 will cause the iris plates 42 and 43 to rotate about their spindles 46 and 48 equally and in the same sense.

A pair of short parallel arms 56 and 57 are provided on the iris plates 43 and 44 respectively and project radially from the corresponding spindles 48 and 50. Formed at the free ends of each of the arms 56 and 57 are small circular openings 58 and 59 which are equidistant from the corresponding spindles 48 and 50. Connecting the arms 56 and 57 is a link 60 which includes an angulated shank 61 terminating at opposite ends in integrally formed yoke members 63 and 64. The yoke members 63 and 64 engage the free ends of the corresponding arms 56 and 57 and each includes parallel confronting walls 65 having inwardly directed axially aligned conical protuberances or bosses 66, the apices of which register with corresponding openings 58 and 59 whereby to effect a freely pivoted link connection between the arms 56 and 57. As a consequence, rotation of the gear 39 causes the rotation of the iris plates 42, 43 and 44 about their respective spindles in a common sense and in equal amounts.

The inner edges 67 of the iris plates 42, 43 and 44 confront each other to delineate a diaphragm aperture 68 and are preferably curved either in an angular manner in which the converging edges form an angle of 120° or in a smooth manner. As shown, the aperture 68 delineated by the iris plate inner edges 67 is in the shape of a regular hexagon with its center concentric with the opening 17 and the camera optical axis. It is important to note, that the irish plates are so shaped, related and actuated that the aperture 68 is concentric with the camera optical axis independently of the size of the aperture 68.

It is apparent from the above that there has been provided by the present invention an automatic light sensitive diaphragm mechanism which is both rugged and simple, and in which the aperture size and incident light may be optimumly related and where the best part of the camera lens system is employed by reason of the continuous concentricity of the aperture and optical axis. The rotation of the gear 39 by the photovoltaic cell energized meter 12 rocks the iris plates so that the aperture delineating edges thereof move equally and symmetrically relative to the camera optical axis.

While there has been illustrated and described a preferred embodiment of the present invention it is apparent that numerous alterations, omissions and additions may be made without departing from the spirit thereof.

What is claimed is:

1. An improved automatic light responsive camera diaphragm comprising a current meter having a rotatable armature, a pinion gear connected to and rotatable by said armature, a diaphragm including a set of three pivoted iris plates having inner angulated edges delineating a diaphragm variable aperture of substantially regular hexagonal configuration, a first two of said iris plates having rack defining toothed outer edges engaging said pinion gear and a rigid link coupling one of said first two iris plates to the third iris plate whereby said aperture delineating edges move in unison toward and away from each other while substantially maintaining said hexagonal configuration, said link being pivotally connected to said respective iris plates.

2. An automatic diaphragm in accordance with claim 1 wherein said link is connected to said corresponding iris plates at points equidistant from the respective pivot points of said iris plates.

3. An automatic diaphragm in accordance with claim 1 wherein said aperture delineating edges are synchronously symmetrically movable relative to the optical axis of the camera.

4. An automatic diaphragm in accordance with claim 3 wherein said iris plates are pivoted at points equally spaced from each other and equidistant from said camera optical axis.

5. An improved automatic light responsive camera diaphragm mechanism comprising a current meter having a rotatable armature, a rotatable pinion gear, means coupling said pinion gear to said armature whereby the rotation of said gear and armature are non-linearly related, a diaphragm including a set of three pivoted iris plates having inner angulated edges delineating a diaphragm variable aperture of substantially regular hexagonal configuration, a first and second of said iris plates having rack defining toothed outer edges engaging said pinion gear and the third of said iris plates coupled to said first iris plate by a pivoted rigid link member whereby said iris plates move in unison to vary said diaphragm aperture size while maintaining said hexagonal configuration of said aperture.

6. An improved automatic light responsive camera diaphragm comprising a current meter having a rotatable armature, a rotatable pinion gear, a cam surface carried by said pinion gear, an arm extending radially from said armature and terminating in a transversely projecting follower engaging said cam surface whereby the rotation of said gear and armature are non-linearly related, a diaphragm including a set of three pivoted iris plates having angulated inner edges delineating a diaphragm variable aperture of substantially regular hexagonal configuration, a first and second of said iris plates having rack defining toothed outer edges engaging said pinion gear and the third of said iris plates coupled to said first iris plate by a pivoted rigid link member whereby said iris plates move in unison to vary said diaphragm aperture size while maintaining said hexagonal configuration of said aperture.

7. An automatic diaphragm in accordance with claim 6 wherein said cam surface is defined by the wall of a recess formed in an end face of said pinion gear.

8. An improved automatic light responsive camera diaphragm mechanism comprising a current meter having a movable armature, a set of three pivoted iris plates having angulated inner edges delineating a variable diaphragm aperture of substantially regular polygonal configuration, means coupling a first and second of said iris plates to said armature, and a rigid link element coupling the third of said iris plates to said first iris plate whereby said iris plates move in substantial synchronism, the ends of said link element being pivotally connected to respective iris plates to vary said diaphragm aperture while substantially maintaining said polygonal configuration.

9. An improved automatic light responsive camera diaphragm comprising a current meter having a rotatable armature, a pinion gear connected to and rotatable by said armature, a diaphragm including a set of three pivoted iris plates having angulated inner edges delineating a diaphrgam variable aperture of substantially regular polygonal configuration, a first and second of said iris plates having toothed outer edges engaging said pinion gear, and a rigid link coupling the third of said iris plates to said first iris plate whereby said iris plates move in unison to vary said diaphragm aperture size while substantially maintaining said regular polygonal configuration.

References Cited in the file of this patent
UNITED STATES PATENTS

| | | |
|---|---|---|
| 2,209,639 | Tonnies | July 30, 1940 |
| 2,213,742 | Mihalyi | Sept. 3, 1940 |
| 2,841,064 | Bagby et al. | July 1, 1958 |

FOREIGN PATENTS

| | | |
|---|---|---|
| 698,573 | Great Britain | Oct. 21, 1953 |